United States Patent [19]

Okada et al.

[11] 4,418,144
[45] Nov. 29, 1983

[54] PROCESS FOR PRODUCING GAMMA-CYCLODEXTRINS

[75] Inventors: Minoru Okada, Mishima; Masamitsu Matsuzawa, Fuji; Osamu Uezima, Mishima; Teruo Nakakuki, Ibaragi; Koki Horikoshi, Tokyo, all of Japan

[73] Assignees: Nihon Shokuhin Kako Co., Ltd.; Rikagaku Kenkyusho, both of Japan

[21] Appl. No.: 287,252

[22] Filed: Jul. 27, 1981

[30] Foreign Application Priority Data

Mar. 6, 1981 [JP] Japan .................................. 56/31259

[51] Int. Cl.³ ........................ C12P 19/20; C12P 19/18
[52] U.S. Cl. ........................................ 435/96; 435/97; 536/103
[58] Field of Search .................... 435/97, 96; 536/103

[56] References Cited

U.S. PATENT DOCUMENTS 4,303,787 12/1981 Horikoshi et al. .................. 536/103

Primary Examiner—Lionel M. Shapiro
Attorney, Agent, or Firm—Bucknam and Archer

[57] ABSTRACT

This invention relates to a process for producing $\gamma$-cyclodextrin without using any organic solvents i.e. by non-solvent process and more particularly, to processes for producing $\gamma$-cyclodextrin, which comprise: (1) passing a sugar solution containing cyclodextrins and reducing sugars as primary ingredients through a column packed with alkali or alkali earth metal salts of strongly acidic cation exchange resin to separate cyclodextrins fraction from reducing sugars fraction and then, passing the cyclodextrins fraction through a column packed with gel resin particles to separate and collect $\gamma$-cyclodextrin and, (2) bringing the sugar solution into contact with a hydrophobic, synthetic adsorption resin comprising a porous polymer to adsorb only $\gamma$-cyclodextrin or $\gamma$- and $\beta$-cyclodextrins and then, eluting the adsorbed cyclodextrin(s) with water to separate and collect $\gamma$-cyclodextrin.

2 Claims, 4 Drawing Figures

PROCESS FOR PRODUCING GAMMA-CYCLODEXTRINS

BACKGROUND OF THE INVENTION

1. Field of the Invention

This invention relates to a process for producing γ-cyclodextrin without using any organic solvents i.e. by non-solvent process and more particularly, to processes for producing γ-cyclodextrin, which comprise: (1) passing a sugar solution containing cyclodextrins and reducing sugars as primary ingredients through a column packed with alkali or alkali earth metal salts of strongly acidic cation exchange resin to separate cyclodextrins fraction from reducing sugars fraction and then, passing the cyclodextrins fraction through a column packed with gel resin particles to separate and collect γ-cyclodextrin and, (2) bringing the sugar solution into contact with a hydrophobic, synthetic adsorption resin comprising a porous polymer to adsorb only γ-cyclodextrin or γ- and β-cyclodextrins and then, eluting the adsorbed cyclodextrin(s) with water to separate and collect γ-cyclodextrin.

2. Description of the Prior Art

Cyclodextrins are non-reducing dextrins which have a ring structure wherein glucose units are joined to one another by α-1,4-glucosidic linkages. Generally, α-cyclodextrin, β-cyclodextrin and γ-cyclodextrin, which consist of 6, 7 and 8 glucose units, respectively, are well known. The cyclodextrin molecule includes various kinds of organic compounds into the cavity of the ring structure which is in a hydrophobic atmosphere to form an inclusion compound. Alpha-, beta- and gamma-cyclodextrins have many different physical properties from one another: the molecular weights ($\alpha = 973$, $\beta = 1135$ and $\gamma = 1297$), the cavity diameters of ring structure ($\alpha = 5$–$6$ Å, $\beta = 7$–$8$ Å and $\gamma = 9$–$10$ Å) and water solubility (at 25° C., g/100 ml.H$_2$O: $\alpha = 14.5$, $\beta = 1.85$ and $\gamma = 23.2$)

Accordingly, cyclodextrins find wide use in medicines, agricultural chemicals, cosmetics and foods and new applications thereof are expected to be found. Only a mixture of α-, β- and γ-cyclodextrins and starch hydrolyzate containing acyclic dextrins and β-cyclodextrin precipitated and separated from such mixture, are products which can be produced, at present, at relatively low cost. Alpha-cyclodextrin and γ-cyclodextrin can not be produced at low cost. The industrial production of α- and γ-cyclodextrins is deemed difficult, although they have special properties and their specific applications are expected as described above. This is due to the difference of water solubility of α-, β- and γ-cyclodextrins. Namely, the water-solubility of β-cyclodextrin is very low compared with α- and γ-cyclodextrins and thereofore, it is easily precipitated and separated from the starch hydrolyzate solution containing cyclodextrins. On the contrary, α- and γ-cyclodextrins have relatively high water solubilities and so, it is difficult without using any organic solvents to separate these cyclodextrins as crystal from the starch hydrolyzate solution containing cyclodextrins.

There are many proposed processes for producing cyclodextrins hereinbefore. One typical process is such that liquefied starch products are reacted with cyclodextrin glycosyltransferase, hereinafter refer to "CGTase," to obtain starch hydrolyzate solution containing cyclodextrins followed by adding an organic solvent such as trichloroethylene, tetrachloroethane or bromobenzene to precipitate cyclodextrins as a complex and to separate cyclodextrins from the starch hydrolyzate.

An improved process of the typical one mentioned above has been proposed, which comprises reacting the starch hydrolyzate containing cyclodextrins with glucoamylase in order to hydrolyse acyclic dextrins to convert them into glucose and then adding an organic solvent to the resulting sugar solution containing cyclodextrins and glucose to precipitate only cyclodextrins (see DENPUN-KAGAKU (Starch Science) 22, pp. 6–10 (1975): Japanese Pat. No. 1,034,493).

However, organic solvents are used to precipitate cyclodextrins in all the aforementioned processes and contaminate the cyclodextrins thus obtained so that they cannot be utilized in the production of medicines or foods due to the toxicity of the solvents and the production cost should have been high.

Some processes for producing cyclodextrins without using any organic solvents, that is, non-solvent processes have recently been discussed and proposed. There are proposed two non-solvent processes, that is, the one comprising reacting liquefied starch with an enzyme having an optimum pH on the alkaline side instead of CGTase, concentrating the reaction mixture and adding a small amount of cyclodextrin as a seed crystal to precipitate cyclodextrins (see Japanese Pat. No. 914,137) and the other comprising contacting a solution containing cyclodextrins and reducing sugars with OH type of anion exchange resin to adsorb only reducing sugars on the resin to thereby separate cyclodextrins from the reducing sugars (see Japanese Patent Disclosure No. 136,889/1976).

These non-solvent processes are advantageous since cyclodextrins obtained by the processes have no toxicity of the solvents so that they can widely be used in the field of medicines or foods. However, these processes have some disadvantages: the former process requires complicated operations and the latter process wherein OH type of anion exchange resin is used is not sufficient to effectively and continuously produce cyclodextrins because elution rate of reducing sugars adsorbed on the resin is too low, and if HCl is used to increase the elution rate, a regeneration of the resin after HCl elution is required and further, a temperature of liquid passing through the column packed with the resin should be controlled below 20° C. in order to prevent reducing sugars adsorbed from decomposing. In addition, the aforementioned non-solvent processes are those for producing β-cyclodextrin or a mixture of α-, β- and γ-cyclodextrins but are not those for selectively separating γ-cyclodextrin or γ-cyclodextrin.

The inventors have proposed a process for producing cyclodextrins, which comprise passing a sugar solution containing cyclodextrins and reducing sugars as primary ingredients through a column packed with alkali or alkali earth metal salts of strongly acidic cation exchanged resin to separate and collect cyclodextrins with industrial and economic advantages (see the specification of Japanese Patent Application No. 104,383/1980). However, the product obtained by this process is a mixture of α-, β- and γ-cyclodextrins or α-cyclodextrin. Gamma-cyclodextrin could not selectively produced by the above mentioned process. It is known that a solution obtained by dissolving crystalline α-, β- and γ-cyclodextrins is passed through a column packed with gel resin particles, each fraction of α-, β- and γ- cyclodextrins can be separated on a laboratory scale. It is, however, not known at all that starch hydrolyzate containing cyclodextrins obtained by reacting liquefied or gelatinized starch with an enzyme is subjected to a gel filtration to separate and collect $\gamma$-cyclodextrin and such a process has been deemed impossible on an industrial scale.

As stated above, cyclodextrins which have special molecular structure and properties and from which possible utilization, in particular, $\gamma$-cyclodextrin which has a high water solubility and a large cavity diameter of the molecule, may be extremely be useful, if cyclodextrins or $\gamma$-cyclodextrin could be produced with industrial and economic advantages.

SUMMARY OF THE INVENTION

Accordingly, an object of this invention is to provide a process for producing $\gamma$-cyclodextrin by non-solvent process in a high efficiency.

Another object of this invention is to provide a process for separating and collecting only $\gamma$-cyclodextrin from a solution containing $\alpha$, $\beta$- and $\gamma$-cyclodextrins.

The inventors have studied the matter to accomplish the objects and now found that $\gamma$-cyclodextrin can be separated and collected with a high efficiency and an industrial advantage by subjecting the cyclodextrins fraction obtained by the above mentioned process the inventors proposed, to a gel filtration.

The inventors have further studied the matter to accomplish the above mentioned objects and found that only $\gamma$-cyclodextrin is selectively and efficiently obtained by a process comprising bringing a sugar solution containing cyclodextrins and reducing sugars as primary ingredients into contact with a synthetic adsorption resin comprising a porous polymer to adsorb $\gamma$-cyclodextrin or $\beta$- and $\gamma$-cyclodextrins, and then eluting the adsorbed cyclodextrin(s) with water, wherein the column temperature during the adsorption or the elution is controlled, even if the reducing sugars fraction is not separated from the sugar solution.

This invention has been completed under the discoveries mentioned above. According to the first embodiments of the present invention, there is provided a process for producing $\gamma$-cyclodextrin comprising steps of:

the first step comprising reacting gelatinized or liquefied starch with cyclodextrin glycosyltransferase to obtain starch hydrolyzate containing cyclodextrins and reacting said starch hydrolyzate containing cyclodextrins with glucoamylase having poor if any $\alpha$-amylase activity to prepare a sugar solution containing glucose and $\alpha$, $\beta$- and $\gamma$-cyclodextrins as primary ingredients;

the second step comprising passing the sugar solution through a column packed with alkali or alkali earth metal salts of strongly acidic cation exchange resin to separate $\alpha$-, $\beta$- and $\gamma$-cyclodextrins fraction from glucose fraction; and the third step comprising passing the $\alpha$-, $\beta$- and $\gamma$-cyclodextrins fraction through a column packed with gel resin particles to separate and collect $\gamma$-cyclodextrin.

According to the second embodiment of the present invention, there is provided a process for producing $\gamma$-cyclodextrin comprising: bringing a sugar solution containing cyclodextrins into contact with a hydrophobic, synthetic adsorption resin comprising a porous polymer and having a selective adsorptivity to cyclodextrins, to selectively adsorb only $\gamma$-cyclodextrin and then, eluting the adsorbed $\gamma$-cyclodextrin with water.

According to the third embodiment of the present invention, there is provided a process for producing $\gamma$-cyclodextrin comprising: bringing a sugar solution containing cyclodextrins into contact with a hydrophobic, synthetic adsorption resin comprising a porous polymer and having a selective adsorptivity to cyclodextrins, to selectively adsorb only $\beta$-cyclodextrin and $\gamma$-cyclodextrin, eluting the adsorbed $\beta$-cyclodextrin and then eluting the adsorbed $\gamma$-cyclodextrin with water.

BRIEF DESCRIPTION OF THE DRAWING

In FIGS. 1 and 2, A, B, C, D and E represent fractions of cyclodextrins, glucose, oligo saccharides, $\gamma$-cyclodextrin and a mixture of $\alpha$- and $\beta$-cyclodextrins, respectively.

In FIGS. 3 and 4, A, B, C and D show concentration of eluted reducing sugars, $\alpha$-cyclodextrin, $\beta$-cyclodextrin and $\gamma$-cyclodextrin in each fraction, respectively, and E shows a column temperature.

DESCRIPTION OF THE PREFERRED EMBODIMENTS

Figure 1:
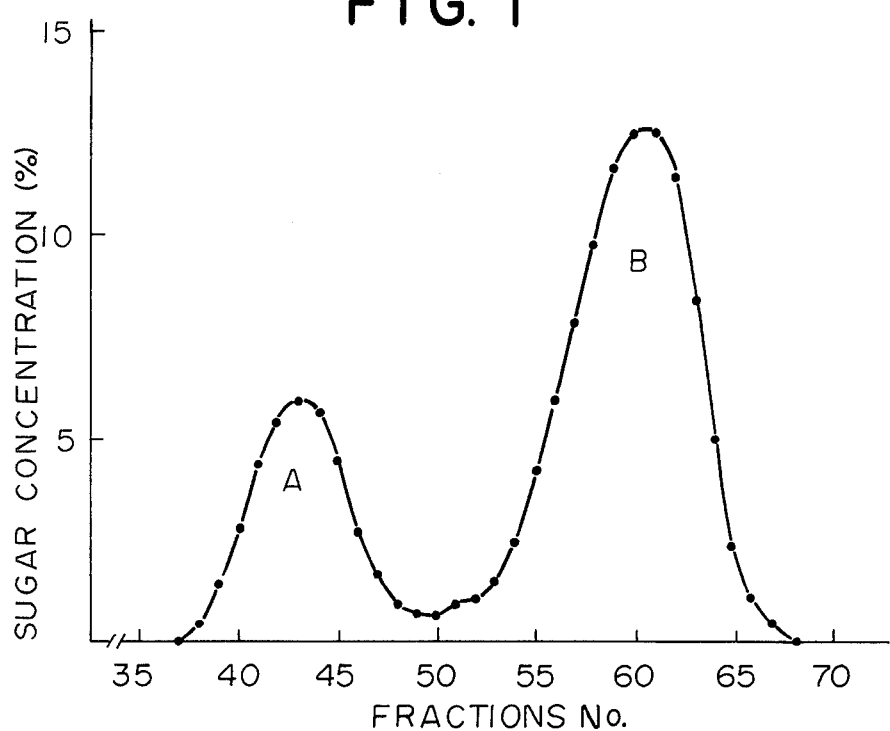
FIG. 1 shows an elution pattern according to the first embodiment of the present invention, which was obtained when the sugar solution containing $\alpha$-, $\beta$- and $\gamma$-cyclodextrins and glucose as primary ingredients prepared in the first step of the first embodiment, was fed to the column packed with strongly acidic cation exchanged resin after which it was eluted with water at 60° C.

The processes of the present invention will now be described in detail. Firstly, the first embodiment of the present invention will be described. This process comprises the following three steps. The first step of this process is one in which a sugar solution containing $\alpha$, $\beta$- and $\gamma$-cyclodextrins and glucose as primary ingredients is prepared. The sugar solution may be obtained by, for example, the following process. A suspension containing 2 to 40% of starch is heated with stirring to obtain a gelatinized starch solution or the suspension is reacted with a liquefying enzyme to obtain a liquefied starch solution, into which CGTase is added to convert the gelatinized or liquefied starch into starch hydrolyzate containing $\alpha$, $\beta$-and $\gamma$-cyclodextrins and acyclic dextrins. The starch hydrolyzate is heated to inactivate the enzyme and then is reacted with glucoamylase having poor, if any, $\alpha$-amylase activity, to obtain the sugar solution containing $\alpha$-, $\beta$- and $\gamma$-cyclodextrins and glucose as primary ingredients. In this first step, unhydrolyzed acyclic dextrins contained in the starch hydrolyzate solution are reacted with an enzyme to convert the acyclic dextrins into glucose, in order to effectively perform the fractional processes in the succeeding second and third steps. For this purpose, glucoamylase having poor, if any, $\alpha$-amylase activity is required to be reacted, for the reason that: it has been found that $\gamma$- cyclodextrin is easily hydrolyzed with α-amylase, especially saccharogenic α-amylase, so that commercially available glucoamylase having α-amylase activity would hydrolyze γ-cyclodextrin, which results in low yield of the final product. Examples of CGTase include known enzymes obtained from microorganisms belonging to Bacillus sp. such as *Bacillus macerans, Bacillus circulans* and alkalophilic bacteria. Working conditions of CGTase may be suitably determined depending on optimum pH (typically 4.5 to 8.5) and optimum temperature (typically 50° to 75° C.). Examples of glucoamylase having poor, if any, α-amylase activity include commercially available pure glucoamylase or purified glucoamylase commercially available (see, for example, S. Suzuki and M. Nakamura, "DENPUN-KAGAKU (Starch Science)" Handbook, Asakura Shoten, pp. 267 to 271, 1977).

Working conditions of glucoamylase is such ones under which glucose is typically produced from starch, that is, glucoamylase is used in the amount of about 1 to 5 IU per 1 g of solid and is reacted at a temperature of about 50° to 60° C. and at pH of about 4.0 to 5.5, for about 10 to 50 hours.

Next, in the second step of this process, the sugar solution prepared in the preceding first step and containing α, β- and γ-cyclodextrins and glucose as primary ingredients is passed through the column packed with strongly acidic cation exchange resin to separate and collect α-, β- and γ-cyclodextrins fraction from the sugar solution. Examples of strongly acidic cation exchange resin include alkali or alkali earth metal salts of cross-linked styrene-divinylbenzene copolymer having sulfonyl groups. Examples of commercially available resin include DIAION-SK-series such as IB, IAG, 100, 102, 104, 106, 110, 112 and 116, AMBERLITE-IR-series such as 120B, 12T, 116, 118, 122 and 124, and DOWEX-50W. The smaller the particle size of resin, the better is the separation of cyclodextrins from reducing sugars. However, in consideration of water pressure loss while passing a liquid through the column packed with such resin, the particle size is in the range of 20 to 200, preferably 30 to 100 mesh. A higher temperature at which fractionation is performed leads to a good separation, however, the temperature is preferably in the range of 50° to 80° C. in consideration of sugar decomposition or resin life. Below 50° C., the efficiency of separation is not satisfactory and an undesirable infection of microorganism may occur and above 80° C., sugar decomposition occurs and the resin life is short. A pH of a sugar solution to be passed through may be in the range of 3 to 6 which a typical sugar solution shows. A concentration of the sugar solution is less than 60%, preferably in the range of 20 to 50%. The sugar solution or the effluent are passed through the column at a space velocity (SV) of 0.1 to 1.0. The process by which a liquid is passed through the column is suitably selected from those such as fixed bed, moving bed and false moving bed processes.

The following illustrates an example of the fractional chromatography by which cyclodextrins are separated from glucose according to this second step.

15 Ml of sugar solution containing 23.5% of solid (which consists of 2.8% of α-cyclodextrin, 7.1% of β-cyclodextrin, 11.2% of β-cyclodextrin, 77.4% of glucose and 1.5% of oligosaccharides) was fed to a column having an internal diameter of 2.6 cm and a height of 70 cm and packed with 320 ml of strongly acidic cation exchange resin (DIAION-SK-IBS, Na type) after which, the eluting water of 60° C. was passed through the column at SV=0.45. The effluent liquid was collected in successive fractions of 5 g, each of which were then analyzed. This is illustrated graphically in FIG. 1 wherein cyclodextrins and glucose fractions are represented by A and B, respectively and the two fractions are advantageously separated. An amount of γ-cyclodextrin contained in the cyclodextrins fraction obtained by the second step exemplified above, is 51.8% of the total solid. According to this second step, a great amount of glucose fraction can be separated so that high pure cyclodextrins can be collected and further, γ-cyclodextrin contained in the cyclodextrins fraction can be increased, which leads to a high efficiency of separation in the succeeding gel chromatography process of the third step.

Figure 2:
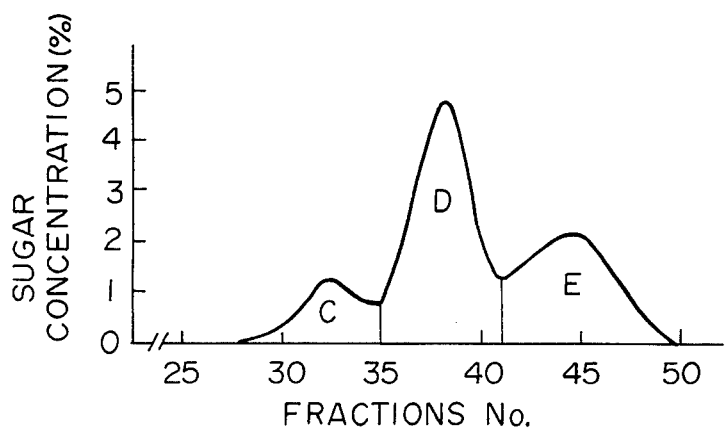
FIG. 2 shows an elution pattern according to the third step of the first embodiment of the present invention, which was obtained when the cyclodextrins fraction prepared in the second step of the first embodiment was fed to the column packed with gel resin particles after which it was eluted with water at 60° C.

Finally, according to the third step, the cyclodextrins fraction obtained in the preceding second step is subjected to a gel chromatography to separate γ-cyclodextrin. For this purpose, all the cyclodextrins fractions are collected and concentrated to a concentration of 20 to 50%. With or without removing β-cyclodextrin crystallized out, the resulting solution is fed to the column packed with gel resin particles and then water is passed through the column to fractionate and elute γ-cyclodextrin. Alternatively, the sugar solution containing cyclodextrins and glucose as primary ingredients obtained in the first step may be passed through the column in which the two columns to be used in the second and the third steps are connected in series, to fractionate and elute γ-cyclodextrin. In the latter process, removal of glucose fraction between the second and the third steps results in a high separation efficiency in the third step. Examples of gel resin particles used in the third step include Bio-gel P-2, P-4 and p-6 (Bio-Rad Lab.Co.),Sephadex G-10, G-15 and G-25 (Pharmacia Co.) and Toyopearl EW-35, HW-40 and HW-50 (Toyosoda, Co., Ltd.), all of which are commercially available. The following illustrates conditions under which gel filtration is performed: a specific velocity (SV) is in the range of 0.05 to 0.5, a temperature is in the range of 20° to 80° C., a concentration of a sugar solution to be treated is in the range of 10 to 50%, and volume of a sugar solution to be fed into the column in each operation is in the range of about 1 to 10% of apparent volume of packed gel resin particles. The following illustrates an example of the third step in shich γ-cyclodextrin is separated from cyclodextrins fraction. The 10 ml of cyclodextrins fraction obtaned in the preceding second step having concentration of 29.4% of solid (which consists of 16.1% of α-cyclodextrin, 22.0% of β-cyclodextrin, 52.2% of γ-cyclodextrin and 9.7% of oligosaccharides) was fed to a column having an internal diameter of 2.6 cm and a height of 70 cm and packed with 370 ml of gel resin particles (Toyopearl HW-40S) after which the eluting water of 60° C. was passed through the column at SV=0.22. The effluent liquid was collected in successive fractions of 5 g, each of which was then analyzed. This is illustrated graphically in FIG. 2 wherein each fractions of oligosaccharides, γ-cyclodextrin and a mixture of α- and β-cyclodextrins are represented by C, D and E, respectively. γ-Cyclodextrin obtained from the fraction D has a purity of 93.2% determined by liquid chromatography method. Thus, the cyclodextrins fraction obtained in the second step can be fractionated by the gel chromatography to separate γ-cyclodextrin fraction from α-and β-cyclodextrins fraction in a high efficiency.

As mentioned above, the object of the process of the first embodiment can be performed by the process consisting of the three step, that is, the first step comprising preparing a sugar solution containing α-, β- and γ-cyclodextrins and glucose as primary ingredients, the second one comprising fractionating the sugar solution to give each fractions of α-, β- and γ-cyclodextrins and glucose and, the third one comprising separating β-cyclodextrin fraction from the α-, β- and γ-cyclodextrins fraction. For example, a lack of the first step leads to a trouble in operation to separate cyclodextrins fraction and, a lack of the second step results in need of an unreasonably large column and a great amount of gel resin particles used in the fractionation in the third step, which will lead this process uneconomical so that it will be impossible to practise the process on an industrial scale.

Next, the second and the third embodiments of the present invention will be described.

According to the second and the third embodiments of the present invention, when starch hydrolyzate solution containing cyclodextrins is brought into contact with a specific, synthetic adsorption resin, only cyclodextrins are adsorbed and the starch hydrolyzate other than cyclodextrins are not adsorbed at all. If some specific resin is used, α-cyclodextrin is not adsorbed and further if a column temperature at which the starch hydrolyzates solution containing cyclodextrins is fed to the column is suitably selected, β-cyclodextrin is not adsorbed, either and thus, only β- and γ-cyclodextrins or only γ-cyclodextrin may be selectively adsorbed. When β- and γ-cyclodextrin are adsorbed, they can be efficiently separated from each other by continuously or stepwisely changing the column temperature while eluting. Thus, high pure γ-cyclodextrin can be efficiently obtained in a high yield.

Starting material employed in the processes of the second and the third embodiments of the present invention include a starch hydrolyzate containing cyclodextrins and a sugar solution containing γ-cyclodextrin obtained by removing a smaller or greater part of α- or β-cyclodextrins from the starch hydrolyzate which are prepared by reacting starch such as potato starch and corn starch gelatinized or liquefied by a conventional process, with a known cyclodextrin glycosyltransferase produced by a microorganism such as *Bacillus macerans* (IFO-3490, IAM-1277), *Bacillus circulans* (ATCC 61, ATCC 9966) and alkalophilic bacteria, for example, Bacillus sp. No. 38-2 (ATCC 21783).

In the second and the third embodiment, the viscosity of the hydrolyzate or the sugar solution containing cyclodextrins to be brought into contact with the resin is preferably reduced to facilitate the operation and the washing of the resin packed column so that straight or branched chain dextrins other than cyclodextrins is preferably converted into reducing sugars by reacting the dextrins with a saccharogenic enzyme having poor, if any, hydrolytic action on cyclodextrins. The saccharogenic enzyme includes β-amylase and glucoamylase having poor, if any, α-amylase activity, which are amployed in the first step of the first embodiment of the present invention mentioned above.

The sugar solution thus obtained by action of the saccharogenic enzyme and containing mainly cyclodextrins(s) and reducing sugars is brought into contact with the synthetic adsorption resin. For example, the solution may be continuously passed through the resin packed column from the top to the bottom or in contrast with this. By contact with the resin, β- and γ-cyclodextrins or if desired only γ-cyclodextrin contained in the sugar solution are selectively and completely adsorbed on the resin. On the other hand, α-cyclodextrin, reducing sugars and unhydrolyzed dextrins (and if desired β-cyclodextrin) contained in the sugar solution are not adsorbed at all and flow of the column quantitatively. Cyclodextrin(s) to be adsorbed or eluted can be selected by changing the synthetic adsorption resin and the temperature at which adsorption or elution are effected.

The synthetic adsorption resin employed in the processes of the second and the third embodiments of the present invention is a synthetic adsorbent having a huge net structure. The porous polymer adsorption resin may be in the form of sphere or plate or in the amorphous form. Examples of hydrophobic organic porous resins which may be used include, styrene-divinylbenzene copolymer, ethylene-vinylbenzene copolymer, fluoroplastics, silicone resins and polyolefinic resins. Styrene-divinylbenzene copolymer has been found to be particularly useful.

Styrene-divinylbenzene copolymer having a large number of micropores can be obtained in spherical form by suspending and polymerizing styrene and divinylbenzene (cross-linking agent) in water. Porous styrene-divinylbenzene copolymer having more than about 100 $m^2/g$ of specific surface is particularly suitable for use in the process of the second and the third embodiments of the present invention.

Such a copolymer has a very low polarity, a large internal surface, and the property that water vapour can be adsorbed but that liquid water cannot enter the pores.

In general, when carrying out the process of the second and the third embodiments of the present invention, the composition of the resin used and the specific surface thereof have no particular limitation. Generally, any polymer having less than about 1,000 $m^2/g$ of specific surface may be used. The porosity of the polymer is preferably in the range of from 35 to 95%, more preferably 40% to 90%. A porosity of less than 35% results in a decrease in surface and a increase in weight, while a porosity of more than 95% results in deformation of the polymer particles when charging a column, leading eventually to an increase in water pressure loss.

It is also possible to use a polymer in the form of a hydrophobic derivative as a result of treatment with for example, a silane. The pore size of the copolymer has an important influence on the surface area of the adsorbent. It is generally necessary to have apertures of a sufficient and proper size to enable the cyclodextrins to migrate therethrough to the adsorption surface and then be adsorbed.

There is an inversely proportional relationship between surface area and pore size. The smaller the pore size of the adsorbent, the larger is the surface area. Therefore, considering the molecular weights (α:973, β:1135, γ:1297) and sizes of cyclodextrins, an adsorbent having about from 100 to 1,000 $m^2/g$ of specific surface and suitable outward shape is preferably used.

Porous styrene-divinylbenzene copolymer adsorbents having properties as described above include, for example, AMBERLITE XAD-2 and -4 (Rohm & Haas Co. USA), DIAION-HP (Mitsuibishi Chemical Ind. Ltd. JAPAN) and PORAPAK-N, -P, -Q, -R and PORAPAK-QS (Waters Associates, Inc. USA). Amberlite, Diaion and Porapak are Trade Marks of the indicated companies.

Figure 3:
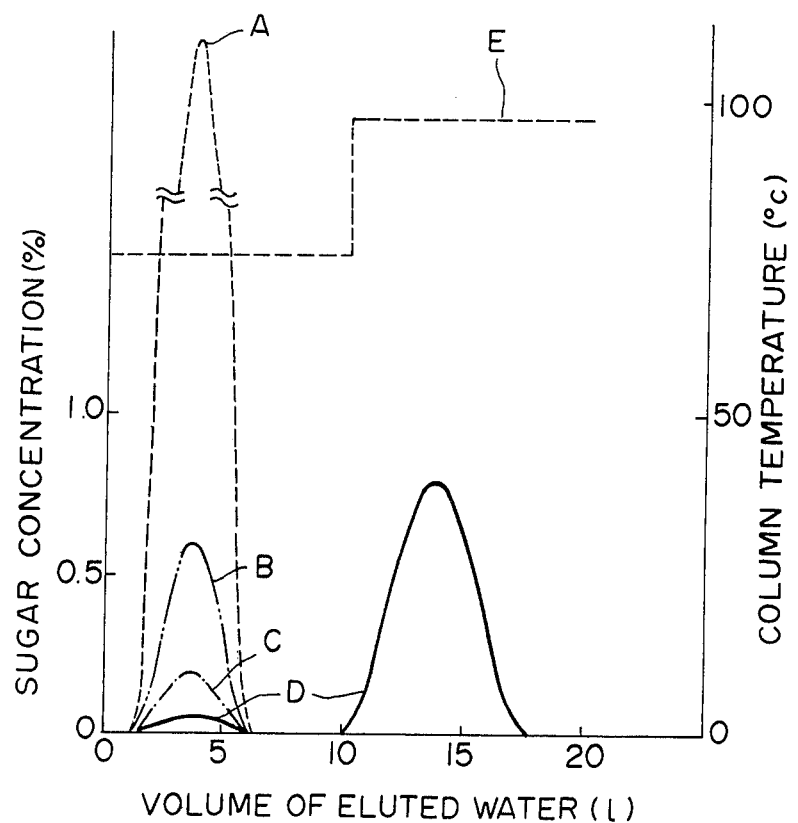
FIG. 3 shows elution pattern according to the second embodiment of the present invention.
Figure 4:
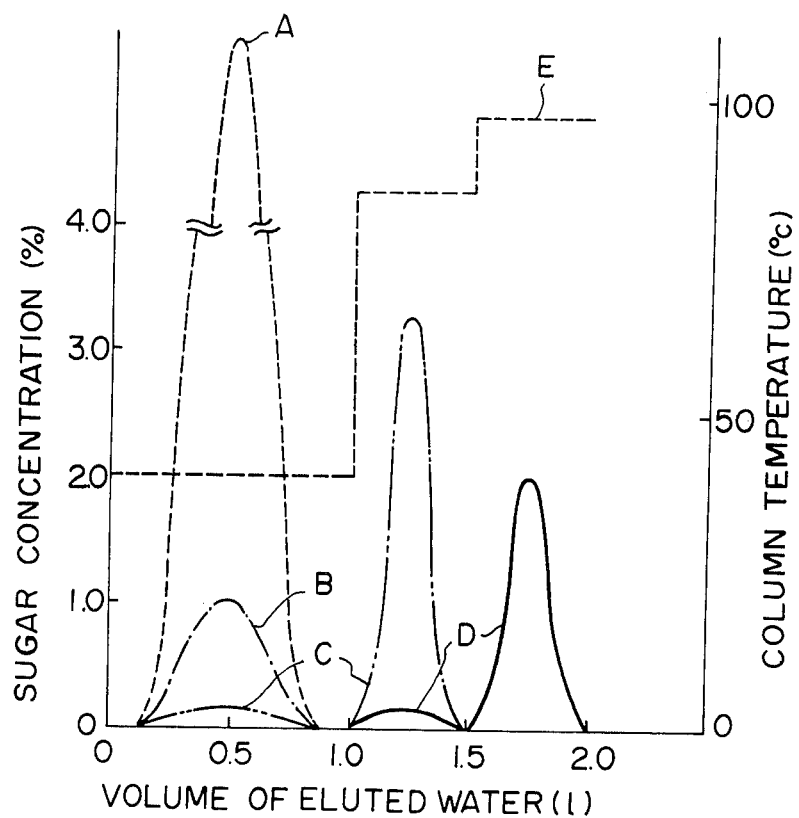
FIG. 4 shows an elution pattern according to the third embodiment of the present invention.

The sequence in which cyclodextrins are eluted and the temperature at which each of cyclodextrins is eluted depend on the properties of the adsorption resin used. For example, DIAION-HP 20 does not adsorb α-cyclodextrin at all and in the range of 0° C. to 80° C., it adsorbs β-cyclodextrin at lower temperature but it does not adsorb β-cyclodextrin with increase in temperature. On the other hand, γ-cyclodextrin is completely adsorbed on the resin at a temperature within this range. Namely, only γ-cyclodextrin is selectively adsorbed in the range of temperature of about 70° C. to about 80° C. The temperature at which adsorption is effected is kept higher than that at which β-cyclodextrin is not substantially adsorbed and lower than that at which γ-cyclodextrin is not substantially eluted (at which β-cyclodextrin is eluted) in order to adsorb only γ-cyclodextrin (see FIG. 3) in the process of the first embodiment of the present invention. The temperature at which adsorption is effected is kept lower than that at which most of β-cyclodextrin is adsorbed in order to adsorb both β- and γ-cyclodextrins and then, the first elution is effected an an elevated temperature sufficient to elute β-cyclodextrin with, if any, a small amount of γ-cyclodextrin after which the second elution is effected, at a further elevated temperature sufficient to elute γ-cyclodextrin to obtain pure γ-cyclodextrin (see FIG. 4). Either of the two processes described above may be selected to adapt the object thereof. The former process is simple and advantageous to obtain only γ-cyclodextrin from the sugar solution which contains relatively a great amount of γ-cyclodextrin and, the latter one is advantageous to obtain γ-cyclodextrin as by product by separating β- and γ-cyclodextrin from the sugar solution which contains relatively a great amount of α-cyclodextrin.

As described above, cyclodextrins are eluted and separated with water while being heated in the processes of the second and the third embodiments of the present invention. In general, substances adsorbed on an adsorbent are eluted and separated with some suitable organic solvents, basic or acids having an interaction with the surface of the adsorbent. On the contrary, adsorbed cyclodextrins can be easily and suitably eluted with hot water or water vapor without using such eluents as organic solvents in the processes of the second and the third embodiments.

It is preferred to saturate the synthetic adsorption resin with cyclodextrins only which can be adsorbed on the resin before the eluation in order to perform high productivity per the resin weight.

The flow rate of the sugar solution fed into the column is intimately related to the diffusion rate of cyclodextrin toward the inside of the adsorption resin particles within the column and the lower the flow rate, the more is the advantage. In general, a space velocity (SV) may be in practice kept at about 1, preferably about 0.5.

An amount of cyclodextrins adsorbed on the resin is almost never related to a cyclodextrins concentration in the sugar solution but is proportional to the absolute amount of cyclodextrins contained.

A concentration of the cyclodextrin-containing sugar solution to be passed through the column is preferably less than 30% by weight due to the low specific gravity of the porous adsorption resin. However, if any means are provided to prevent the resin from floating and if channeling does not occur, the concentration of the sugar solution has no limitations theoretically.

As mentioned above, according to the processes of the second and the third embodiments of the present invention, each of α-, β- and γ-cyclodextrins, especially γ-cyclodextrin can be separated and recovered from the cyclodextrins-containing starch hydrolyzate prepared by reacting gelatinized or liquefied starch with CGTase without using any organic solvents as employed in hitherto processes. These processes of the present invention can continuously be performed with a high efficiency to produce cyclodextrins, particularly γ-cyclodextrin.

The present invention will now be described with reference to the following Examples.

Examples 1 and 2 illustrate the first embodiment of the present invention.

EXAMPLE 1

350 Grams of potato starch was suspended in 2.0 liter of water. To the suspension, 12 mg of calcium chloride and CGTase produced by alkalophilic, Bacillus sp. No. 32-2 (ATCC 21783, BIKOKEN No. 614) in an amount of 50 units per one gram of starch were added and the mixture was heated at 80° C. for 30 minutes and was liquefied. The liquefied starch solution was then heated at 120° C. for 10 minutes in an autoclave in inactivate the enzyme. After cooling the resulting liquefied solution, the CGTase mentioned above was added to the solution in an amount of 100 units per one gram of starch and the mixture was reacted at pH 7.5 for 40 hours at 65° C. The resulting solution was heated to inactivate the enzyme and then, purified glucoamylase (the product of SEIKAGAKU KOGYO Co., Ltd. 3,400 IU) was added to the solution in an amount of 0.1% by weight of the solids content and the mixture was reacted at pH 5.0 for 30 hours at 55° C. The reaction mixture was then purified by the conventional method and concentrated, 62 g of crystalline β-cyclodextrin was removed by filtration and 545 g of 40% sugar solution containing glucose and cyclodextrins as primary ingredients was obtained. The solids of the sugar solution consists of 78.2% of glucose, 1.4% of oligosaccharides and 20.4% of cyclodextrins ($\alpha:\beta:\gamma = 2.4:7.6:10.4$).

35 Ml of the resulting sugar solution was fed to a column having an internal diameter of 2.4 cm and a height of 120 cm and packed with 500 ml of strongly acidic cation exchange resin (DIAION-SK-1BS, Na type) at SV=0.26 at 60° C. and then, water was passed through the column. Fractions of 65 g of 4.2% cyclodextrins solution and 146 g of 7.3% glucose solution were obtained. Concentration of γ-cyclodextrin in the cyclodextrins solution was 50.5%. The cyclodextrins fraction was concentrated to a concentration of 22.2% and 100 ml of the concentrate was fed to a column having an internal diameter of 2.4 cm and a height of 70 cm and packed with 380 ml of gel resin particles (Toyopearl HW-40S) at SV=0.24 at 60° C. and then, water was passed through the column. All the γ-cyclodextrin fractions were collected and 33 g of 3.2% sugar solution was obtained. A content of γ-cyclodextrin in the sugar solid was analyzed by high performance liquid chromatography and it was 92.8%. The sugar solution containing γ-cyclodextrin was concentrated to a concentration of 50% and γ-cyclodextrin was crystallized out. 0.5

Grams of γ-cyclodextrin was obtained. The purity was 99.8%.

EXAMPLE 2

The same column packed with the same strongly acidic cation exchange resin as used in Example 1 was connected in series with the same one packed with the same gel resin particles as used in Example 1. To the connected column, 30 ml of 40% sugar solution obtained in the first step of Example 1 and containing glucose and cyclodextrins as primary ingredients was fed at SV=0.22 at 60° C. and then, water was passed through the column. Thus, the separation processes of the second and the third steps between which glucose fractions was removed were successively performed. All fractions of γ-cyclodextrin were collected and 32 g of 3.0% sugar solution was obtained. A content of γ-cyclodextrin in the sugar solids was 93.2%. The sugar solution was concentrated to yield 0.4 g of crystalline γ-cyclodextrin having a purity of 99.9%.

COMPARATIVE EXAMPLE

Example 1 was repeated except that liquefying α-amylase was substituted for purified glucoamylase. Cyclodextrins fraction could not be separated from oligosaccharides fraction at all, so that separation by gel chromatography in the third step was not successful.

On the other hand, the sugar solution obtained in the first step of Example 1 was directly subjected to the gel chromatography in the third step. A peak defined as the γ-cyclodextrin fraction was not obtained, so that γ-cyclodextrin could not be separated and obtained.

The following Examples 3 and 4 illustrate the third and the second embodiments of the present invention, respectively.

REFERENCE EXAMPLE

15 Liter of potato starch solution (4% (w/v), starch content: 600 grams) was adjusted to pH 9.0 with NaOH and was homogeneously gelatinized at a temperature of 125° C. for 30 minutes. After cooling the gelatinized starch solution to 60° C., 600 mg of the enzyme produced by Bacillus sp. No. 38-2 (BIKOKEN No. 614, ATCC 21783) (30,000 units/g and produced by Meito Sangyl Co., Ltd.) was added to the gelatinized starth solution, which was reacted at 60° C. for 30 hours. After the completion of the reaction, the reaction mixture was heated at 100° C. for 5 minutes to inactivate the enzyme, and thereafter cooled to 55° C. and adjusted to pH 5.0 with hydrochloric acid. 900 Mg of flucoamylase (2,000 units/gram, the product (GAS-1) of Amano Pham. Co., Ltd.) were added to the mixture and reaction was allowed to continue for 20 hours. The reaction mixture was decolorized with activated carbon, filtered, deionized and concentrated to 50% by weight solids content. 500 Mg of β-cyclodextrin were then added to the concentrate as seed material and the mixture was allowed to stand overnight in a cold chamber. The resulting precipitated β-cyclodextrin was removed by filtration to obtain a filtrate containing cyclodextrins with a much reduced content of β-cyclodextrin.

EXAMPLE 3

The filtrate obtained in Reference Example (Bx 30.0, d=1.12, 387 ml, 130 g solids, containing α:2.5%, B:6.8% and γ:10.7% by weight) was fed to a column packed with 500 ml of DIAION-HP-20, at a rate of SV=0.5 at 40° C., and then water was passed through the column to wash out the non-adsorbed substances. The column was then raised to 85° C. and adsorbed material thereon was eluted with 500 ml of water, a fraction containing β-cyclodextrin mixed with a small amount of γ-cyclodextrin (13.5 g of the solids content) was obtained. The column was then raised to 97° C. and adsorbed material thereon was eluted with 500 ml of water. The eluate was concentrated and 30 ml of 25% solution was obtained (see FIG. 4). The resulting solution was then decolorized, deionized, and concentrated to Bx 72. A small amount of seed material was added to the concentrate and the mixture was allowed to stand overnight at 40° C. while stirring. The resulting crystalline γ-cyclodextrin was filtered and dried at 60° C. for 12 hours in a vacuum dryer. 10.5 Grams of crystalline powder was obtained. The yield was 75.5% based on γ-cyclodextrin contained in the sugar solution originally passed through the column. A purity of γ-cyclodextrin thus obtained was analyzed by high performance liquid chromatography and was 99.2%.

EXAMPLE 4

Reference Example was repeated except that 900 mg of bacterial liquefying β-amylase (10,000 units/g, the product of Daiwa Kasei Ind. Co., Ltd.) was substituted for glucoamylase. A sugar solution containing clyclodextrins (β:2.5%, β:6.8%, γ:10.7%) was obtained. Glucoamylase (Sumizyme 2000, the product of Shin Nippon Kagaku Co., Ltd., 2000 units/g) was added to the sugar solution in an amount of 0.05% by weight of the solids and the mixture was reacted at pH 5.5 overnight at 50° C. The reaction mixture was then heated at 120° C. for 15 minutes to inactivate the enzyme, decolorized and deionized.

The resulting solution (Bx 28.5, d=1.11, 1.26 liter, 400 g of solids) was fed to a column packed with 3 liter of DIAION-HP-50 at a rate of SV=1 at 75° C. by ascending method and then water was passed through the column by descending method to wash out the non-adsorbed substances.

The column was then raised to 97° C. and adsorbed material thereon was eluted with 10 liter of water at SV=1. The eluate was concentrated and 140 ml of 28% solution (39.2 g of the solids content) was obtained (see FIG. 3). The solution was then decolorized, deionized and concentrated to Bx68. A small amount of seed material was added to the concentrate and the mixture was allowed to stand overnight at 4° C. while stirring. The resulting crystalline γ-cyclodextrin was filtered and dried at 60° C. for 24 hours in a vacuum dryer. 31 Grams of crystalline powder was obtained. The yield was 72.4% based on γ-cyclodextrin contained in the sugar solution first passed through the column. A purity of γ-cyclodextrin thus obtained was analyzed by high performance liquid chromatography and was 99.6%.

What we claim is:

1. A process for the production of γ-cyclodextrin, which consists of:
    preparing a sugar solution containing glucose and α-, β- and γ-cyclodextrins as primary ingredients by reacting glucoamylase having substantially no α-amylase activity with a starch hydrolyzate containing cyclodextrins produced by reacting gelatinized or liquified starch with cyclodextrin glycosyltrasferase;
    passing the sugar solution through a column packed with alkali or alkaline earth metal salts or a strongly acidic cation exchange resin to separate α-, β- and γ-cyclodextrins fraction from glucose fraction; and passing the α-, β- and γ-cyclodextrins fraction through a column packed with gel resin particles to separate and collect γ-cyclodextrin.

2. A process according to claim 1, wherein the strongly acidic cation exchange resin is a cross-linked styrene-divinylbenzene copolymer having sulfonyl groups.

* * * * *